Aug. 30, 1960  H. G. YETTER  2,950,771
JOINTER DEVICE FOR PLOWS
Filed Sept. 4, 1958  2 Sheets-Sheet 1
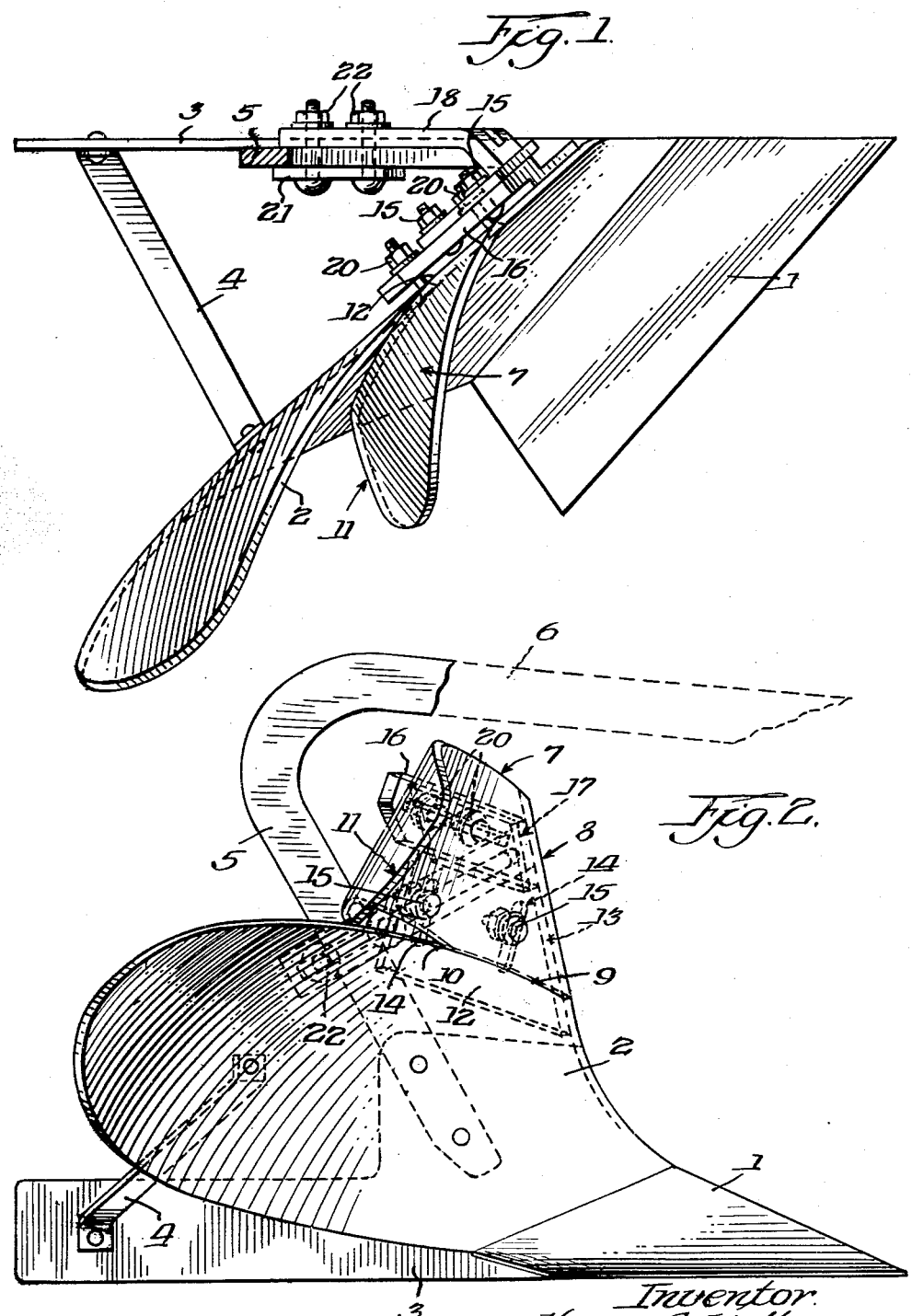

Aug. 30, 1960

H. G. YETTER 2,950,771

JOINTER DEVICE FOR PLOWS

Filed Sept. 4, 1958

Inventor.
Harry G. Yetter.
By Wm. F. Kellogg.
Atty.

United States Patent Office 2,950,771
Patented Aug. 30, 1960

2,950,771

JOINTER DEVICE FOR PLOWS

Harry G. Yetter, Colchester, Ill.

Filed Sept. 4, 1958, Ser. No. 759,077

3 Claims. (Cl. 172—736)

This invention relates to improvements in a jointer device for plows of the moldboard types.

More particularly, it is an object of the invention to provide a jointer which is capable of being simply, quickly and securely installed or mounted on and in cooperative relation to the moldboards of different designs and/or makes of plows without alteration or modification thereof and without need of complex brackets, clamps, etc., or special installing tools.

A further object of the invention resides in the provision of a novel form of multiple direction adjustment mounting for the jointer of such construction that its earth entering or leading edge may be accurately and readily aligned and made contiguous with that of various types or makes of plows receiving the same, and its after portion so positioned with relation to the plow moldboard that it will effectively downwardly deflect trash engaging with and over its surface, and in so doing cause it to be deposited at the bottom of a formed furrow prior to the turning of the soil from said moldboard into said furrow.

A moldboard plow provided with my improved jointer will function to turn over soil engaged by the same in a manner whereby field surface rubbish or trash, including noxious vegetation, sod, stalks, sticks, stubble, stones and other like and commonly encountered field growths and debris will be fully removed and well covered or furrow buried as and during plowing, hence, securing to the user of the jointer the benefits of soil enrichment that may or will result therefrom, and in addition, improve the appearance of a field to the extent that its plowed surface will be free of said debris. Moreover, a field so plowed will have its plowed soil broken and its surface rendered substantially flat and thus, will materially better its condition so that when it is further cultivated, as by harrowing, etc., the soil will be readily friable and will assure better seeding.

The foregoing, as well as other objects, advantages and meritorious teachings of my invention will be in part obvious and in part pointed out in the following detailed disclosure thereof, when taken in conjunction with the accompanying drawings, it being understood that the form of the invention presented herein is precise and what is now considered to be the best mode of embodying its principles, but that other modifications and changes may be made in specific embodiments without departing from its essential features.

In the drawings:

Figure 1 is a top view of a moldboard type of plow provided with my improved jointer showing the adjustable mounting thereof and its relation to the moldboard and its earth entering or cutting forward edge.

Figure 2 is a side elevation of the same taken from the moldboard side, illustrating the contiguous positioning of the jointer leading and earth entering edge to that of the plow.

Figure 3:
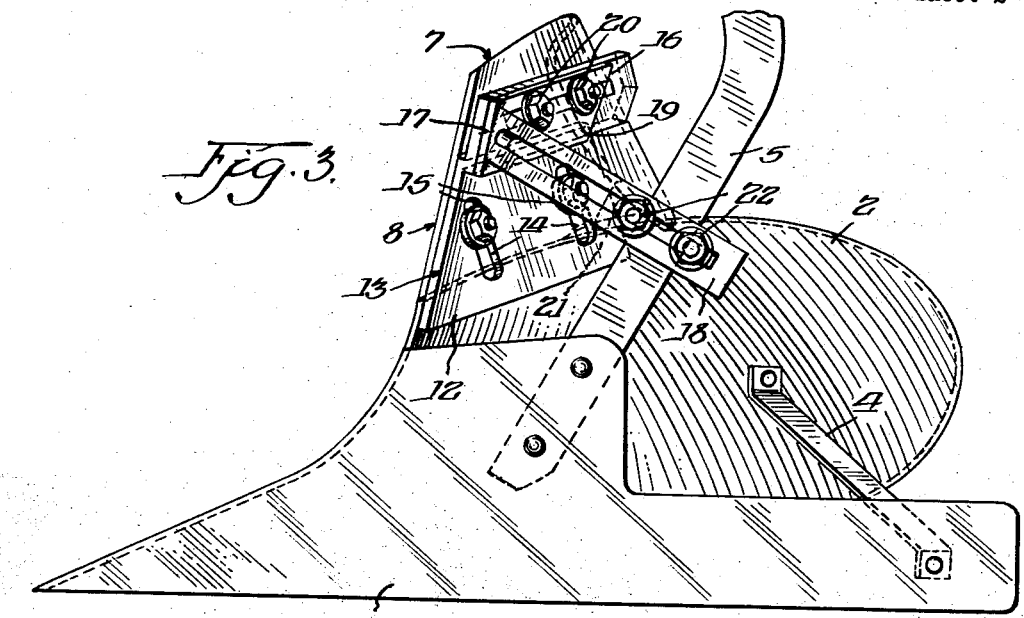
Figure 3 is a side elevation taken from the landslide side of the plow.

Referring in detail to the drawings, a moldboard plow provided with the invention is of prevalent construction and design, including a plowshare 1, a moldboard 2 and a landslide 3. A reinforce 4 may be and usually is positioned between and endwise fixedly connected to portions of the moldboard and landslide, while the plow assembly is fixedly connected to and carried by the shank portion 5 of a plow beam 6. As usual, the leading edges of the plowshare and moldboard constitute an earth entering and cutting edge.

The jointer device of the invention consists of a wing-like steel plate 7 surface treated to provide a maximum of hardness and land polish, not unlike that of the plow-moldboard. Said plate is formed, as hereinbefore inferred, with a rearwardly oblique straight earth entering and cutting edge 8, while its rearward or after portion is curved outwardly and has a slightly downward pitch whereby to serve as a positive deflector of matter engaged with and over its normally outer side and also, prevent soil and trash from passing into and collecting about the plow beam 6.

Figure 4:
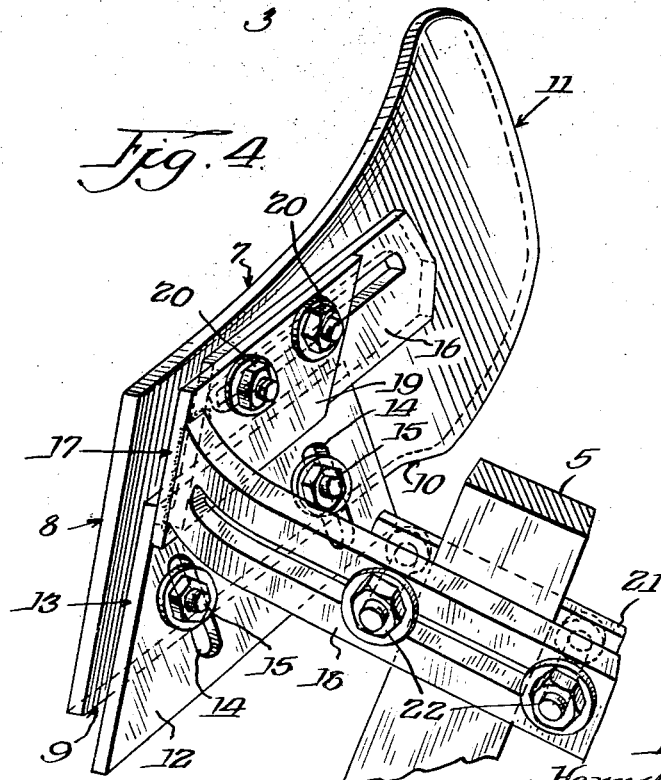
Figure 4 is a detail in perspective of the improved jointer and the mounting therefor, showing the mounting or support arm clamped to an appropriate portion of the plow beam, the latter being fragmentally illustrated.

The forward portion of the lower edge or margin of the jointer is so formed, as at 9, that it will have flush meeting and supporting or seating engagement with the forward portion of the upper edge or margin of the moldboard 2, as shown in Figures 2, 3 and 4 of the drawings. Its rearward portion, i.e., that part on the outwardly curved after or deflector portion of the jointer is curved downwardly, as at 10, to give a continuity of surface and avoid gap as between the jointer outer side and the outer side of the moldboard 2, for an obvious purpose. Preferably, the rear or trailing end of the jointer plate is upwardly obliqued or biased, as at 11, to assure effectual scouring when used in sticky soil.

To mount the jointer on a moldboard plow in that manner shown in Figures 1, 2 and 3, a flat steel plate 12 of depth less than the jointer and having a rearwardly oblique straight forward edge 13, corresponding to the jointer forward edge 8, is provided for positioning adjacent the inner side of the forward portion of said jointer plate. Its lower edge corresponds to the forward edge portion 9 of the jointer while its upper edge is straight. Relatively spaced vertical slots 14 are formed in the plate and are adapted to receive therethrough bolts 15 engaged with and through an appropriate portion of the jointer plate 7. Thus, the plate 12 may be vertically adjusted on the jointer and when adjusted, fixedly secured by tightening the bolts. In consequence, when said plate 12 is secured in that adjusted position shown in Figure 4 and the jointer is seated on the forward portion of the upper edge of the moldboard 2 (see Figure 2), it will have overlapping engagement with the adjacent portion of said moldboard and so, align the jointer therewith whereby its earth entering and cutting edge will be contiguous with the moldboard cutting edge and the outer sides of both the jointer and moldboard will be relatively flush and contiguous.

In order that the jointer plate assembly (above described) may be immovably mounted in the aforesaid aligned relation to the plow moldboard, a longitudinally slotted bracket 16 is welded or otherwise fixedly joined to the upper portion of the outer side of the plate 12 parallel to its upper edge. The forward end of the bracket is rearwardly obliqued, at 17, and is contiguous with the forward end of said plate, while its rearward end is extended beyond the like end of the plate (see Figures 3 and 4).

A bracket support arm 18, slotted substantially throughout its length and fixedly carrying an attaching flat plate 19 on its inturned forward end, serves as a means for connecting and mounting the jointer on the plow. Its attaching plate 19 has flat bearing contact on the outer side of the bracket 16 and is horizontally or longitudinally adjustably connected thereto by engaging bolts 20 therethrough and through the slot in said bracket. The support arm extends inwardly and downwardly from the moldboard 2 and has a parallel clamping plate 21 connected thereto by bolts 22 engaging through the slot in the arm. Thus, the inner end of the support arm can and will be rigidly connected to the plow beam shank portion 5.

The connection between the jointer and the support arm 18 by means of the vertically slotted flat plate 12 and the longitudinally slotted bracket 16 is such as will permit a compound adjustment, i.e., vertical and horizontal, therebetween. Hence, it will be understood that said jointer can be accurately and effectually adapted and provided to moldboard plows of different designs and/or makes in the manner hereinbefore described. Also, because the clamping plate 21 is longitudinally adjustable along the support arm 18, differences in relationing between the plow and plow beam will be compensated for whereby to effect proper positioning of the jointer with relation to and on the moldboard 2 of an equipped plow.

From the foregoing, it is believed that the operation of my improved jointer device will be apparent. As a moldboard plow equipped therewith is moved forwardly and is engaged in or with the soil of a field, said soil is plowed upwardly by the travel of the plow moldboard and landslide therethrough. Soil with trash (noxious growths, stalks, stubble, stones and similar debris) is directed upwardly over the moldboard. Surface trash will be directed onto and over the jointer 7 and deflected laterally and downwardly into the formed furrow ahead of the soil and consequently, will be thoroughly covered by or buried beneath the moldboard and jointer deflected or delivered soil. Moreover, it is of moment to here note that soil engaging and deflected from the jointer onto the furrow will be broken to such an extent as to materially improve its friability, and being so broken, will leave the plowed field surface comparatively flat. As the result of this, subsequent cultivation of the field, as by harrowing, dragging, etc., will be greatly facilitated.

I claim:

1. A jointer for moldboard plows, comprising a deflector plate, the forward portion of the lower edge of which is formed for flush engagement with and along the forward portion of the upper edge of the moldboard with its front edge in continuation of the plow earth entering and cutting edge and the rearward portion thereof curved outwardly with relation to the moldboard and downwardly pitched, a flat plate adjacent the inner side of the forward portion of the deflector plate, means connecting said flat plate to the deflector plate permitting of selective and fixed vertical adjustment of the former with relation to the latter, a portion of the flat plate having overlapping engagement with the inner side of an adjacent portion of the moldboard whereby to align the forward portion and front edge of the deflector plate with the adjacent portion of the moldboard and with the plow earth entering and cutting edge, a horizontally positioned and longitudinally slotted bracket fixedly carried by the flat plate, a bracket support arm, a portion of which is adjacent the longitudinally slotted bracket, means slidable in the slot of said bracket engaging said portion of the support arm whereby to secure the same thereto, and plow beam clamping means on and adjustable longitudinally of the bracket support arm.

2. A device for mounting a jointer plate on the moldboard of a plow, comprising a substantially first flat plate adjacent the inner side of the forward portion of the jointer plate selectively vertically adjustable with relation thereto, a portion of said first plate being adapted to have overlapping engagement with the inner side of a portion of the moldboard whereby to align the forward portion and front edge of the jointer plate with the adjacent portion of the moldboard and with the plow earth entering and cutting edge, a second and longitudinally slotted flat plate connected to and carried by the upper portion of said first plate in substantially horizontal and parallel inwardly spaced relation thereto, the rearward portion of the second plate extending beyond the rearward portion of the first plate, a substantially right-angularly formed plow beam mountable support arm, one portion of which is adjacent and parallel to the longitudinally slotted second plate and adjustably connected thereto through its longitudinal slot and the remaining portion of said support arm being slotted longitudinally, and plow beam engaging and connecting means on said remaining portion of the support arm adjustable along the same and its longitudinal slot.

3. A device for mounting a jointer plate on the moldboard of a plow, comprising a substantially flat plate adapted for positioning adjacent and substantially parallel to the inner side of the forward portion of the jointer plate selectively vertically adjustable with relation thereto, the upper portion of said flat plate being offset inwardly of and from its lower portion and having a longitudinal slot therein for a portion of its length, a substantially right-angularly formed plow beam mountable support arm, one portion of which is adjacent and parallel to the horizontal slot in the inwardly offset upper portion of said first plate and is adjustably connected thereto through its horizontal slot and the remaining portion of the support arm being slotted longitudinally, and plow beam engaging and connecting means on said remaining portion of the support arm adjustable along the same and its longitudinal slot.

References Cited in the file of this patent
UNITED STATES PATENTS

| 362,023 | Lowden | Apr. 26, 1887 |
| 2,712,784 | Bauer | July 12, 1955 |
| 2,829,580 | Bauer | Apr. 8, 1958 |